(12) United States Patent
Santamaria Maso

(10) Patent No.: US 12,468,663 B1
(45) Date of Patent: Nov. 11, 2025

(54) LIGHTWEIGHT IN-MEMORY DATABASE WITH HTTP-BASED SYNCHRONIZATION

(71) Applicant: Amazon Technologies, Inc., Seattle, WA (US)

(72) Inventor: Rolando Santamaria Maso, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 152 days.

(21) Appl. No.: 17/710,042

(22) Filed: Mar. 31, 2022

(51) Int. Cl.
*G06F 16/178* (2019.01)

(52) U.S. Cl.
CPC ................................ *G06F 16/1787* (2019.01)

(58) Field of Classification Search
None
See application file for complete search history.

(56) References Cited

U.S. PATENT DOCUMENTS

| | | | |
|---|---|---|---|
| 10,866,970 B1* | 12/2020 | Xiao | G06F 16/27 |
| 11,823,180 B1* | 11/2023 | Trinh | G06Q 20/3678 |
| 2002/0105548 A1* | 8/2002 | Hayton | G06F 8/38 |
| | | | 715/764 |
| 2017/0212680 A1* | 7/2017 | Waghulde | G06F 3/0616 |
| 2021/0089376 A1* | 3/2021 | Glade | G06F 11/1448 |
| 2022/0231846 A1* | 7/2022 | Panikkar | H04L 9/0866 |

* cited by examiner

*Primary Examiner* — Thu N Nguyen
(74) *Attorney, Agent, or Firm* — Davis Wright Tremaine LLP

(57) ABSTRACT

A collection of data is maintained by at least first and second nodes of a distributed database. The first node maintains a first subset of the collection of data in a first random-access memory, and the second node maintains a second subset of the collection of data in a second random access memory. The first node sends an HTTP-based request to obtain updates to the first subset of the collection of data. The request comprises a unique sortable identifier. The first node receives data from the second node, and updates the first subset of the collection of data based on the receive data.

20 Claims, 7 Drawing Sheets

LIGHTWEIGHT IN-MEMORY DATABASE WITH HTTP-BASED SYNCHRONIZATION

BACKGROUND

Distributed database may employ replication to reduce the likelihood that the failure of an individual component will result in data loss, and as part of scaling the capabilities of the distributed database according to demand. However, replication in a distributed database is often complex, and it may be difficult to add or remove components from the system. Moreover, replication often relies on inflexible configurations of primary and secondary nodes.

BRIEF DESCRIPTION OF THE DRAWINGS

Various techniques will be described with reference to the drawings, in which.

DETAILED DESCRIPTION

In an example, an eventually consistent key-value distributed database is implemented as a collection of database nodes. The database nodes use communication protocols based on hypertext transfer protocol ("HTTP"), to simplify processes for the ingestion and consumption of data, as well as simplifying the deployment and maintenance of the distributed database.

The example distributed database, in some cases, may be implemented independently of a storage layer. This allows use of in-memory, disk-based, and hybrid database technologies, including mixes of these technologies among nodes in the same cluster. The example database may include in-memory or hybrid storage systems, to enable rapid replication between nodes using an approach in which the nodes of the database are self-executing with respect to replication. In this approach to replication, each node independently obtains data to replicate from other nodes, by querying those nodes for applicable replication data.

In a further example, an eventually-consistent key-value database, such as in the preceding example, is used to store large amounts of sensor data obtained from a wide array of devices. To support this data collection, clusters of database nodes are activated according to the amount of data and the number and location of the devices. In some cases, cross-regional replication may be employed to create new clusters that are proximate to new sources of data. Various aspects of the database's design helps to facilitate this, potentially including the lightweight nature of the database engine, the flexible choice of storage engine, and the use of self-executing replication. New nodes, and new clusters of nodes, may be added with minimal impact to the configuration of existing nodes, or to other aspects of the system's configuration.

Figure 1:
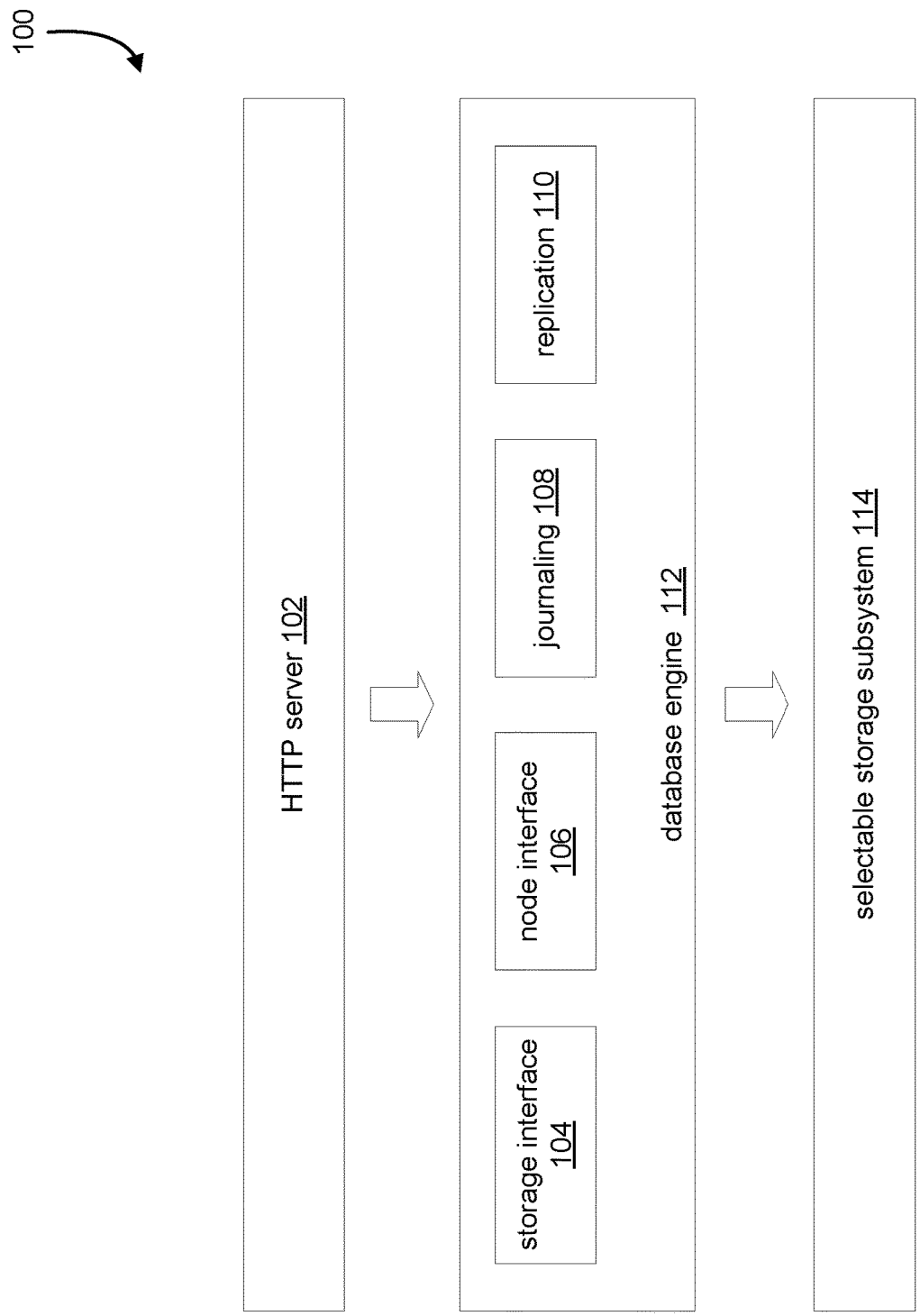
FIG. 1 illustrates a node of a distributed database, in accordance with at least one embodiment.

FIG. 1 illustrates a node 100 of a distributed database, in accordance with at least one embodiment. In at least one embodiment, a node 100 of a distributed database is a computing device on which a lightweight database, with a selectable storage subsystem, operates. This node-level database is accessed via HTTP, and is self-executing with respect to data replication. The replication may also, in embodiments, be performed independently of the storage subsystem. The distributed database may comprise many such nodes.

In at least one embodiment, self-execution with respect to data replication refers to a node of a distributed database, such as the node 100, obtaining replicated data based on its own determinations and/or configuration. For example, in at least one embodiment, the node 100 queries a selected set of other nodes in order to obtain data that falls within whatever range of data that the node 100 is configured to replicate. The nodes in this selected set provide the data in response to these queries. As a further example, assume a distributed database comprising nodes $N_1$, $N_2$, and $N_3$, in which a collection of data is indexed by a alphabetic keys in the range A-Z. In this case, a possible configuration of these nodes might have $N_1$ and $N_3$ each be configured to replicate data from $N_2$. By virtue of being self-executing with respect to data replication, the nodes $N_1$ and $N_3$ each independently obtain data from $N_2$, by querying $N_2$ for data. This approach allows the replication behavior of any node to be changed without affecting the configuration of any of the other nodes. It also allows new nodes to be added to the system without requiring the configuration of existing nodes to be altered.

In at least one embodiment, node 100 comprises an HTTP server 102 that is used to communicate with the node. The node 100 also comprises software and/or circuitry to communicate with other nodes via HTTP. Any of a variety of HTTP-based or HTTP-compatible protocols and data formats may be used in these incoming and outgoing communications. Examples may potentially include, but are not limited to, representational state transfer ("REST"), extended markup language ("XML"), JavaScript object notation ("JSON"), GraphQL, Simple Object Access Protocol ("SOAP"), protocol buffers ("Protobuf"), and so on.

In at least one embodiment, node 100 comprises a journaling component 108 which comprises software and/or circuitry to receive and processes updates to a collection of data. In at least one embodiment, the journaling component 108 is responsible for processing state change requests and maintaining transaction history so that other nodes can synchronize their state at a given point in time. The journaling component 108 may interact with the storage interface 104 to cause data to be stored. In at least one embodiment, the node 100 maintains the collection in a main memory of the node, which may include but is not necessarily limited to random-access memory ("RAM") or other high speed memories. The inclusion and activation of the journaling component 108 causes the node 100 to act as a primary node of the distributed database. A primary node is one capable of processing both reads and writes and, in at least one embodiment, a primary node also maintains transaction history to enable other nodes in the distributed database to synchronize with its state. The journaling component 108 may therefore process write requests by causing the appropriate data to be stored in main memory and updating this transaction history.

In at least one embodiment, node 100 comprises a replication component 110 that assists in replicating data with other nodes in the distributed database. In at least one embodiment, the replication component 110 is responsible for replication from other nodes in the cluster. In at least one embodiment, it maintains a list of the nodes from which replication data is obtained, and holds a ULID of the last change received by each node in the network. In at least one embodiment, the replication component 110 performs functions which comprise assisting the node's response to replication-related queries, by identifying updates to send to back the node that issued the query. It may also comprise assisting the node 100 when it queries other nodes for replication data, by providing information to indicate the current state of the node's data. For example, consider a case where a node $N_1$ queries for replication data from another node $N_2$, and where the node $N_1$ issues a query for replication data to $N_2$. The query issued by $N_1$ comprises a universally unique lexicographically sortable identifier ("ULID"). The ULID may be obtained from $N_1$'s replication component 110 and/or its journaling component 108, and represents the most recent update, or transaction, processed by the node 100. When $N_2$ receives the query, it compares the received ULID (which may be denoted as $U_1$) to ULIDs associated with updates that it has processed, and returns information about any updates whose associated ULID is greater than $U_1$ to $N_1$. In at least one embodiment, the replication component 110 and/or journaling component 108 of $N_2$ assists in identifying there updates and responding to $N_1$'s query.

In at least one embodiment, a ULID is a numeric or alphanumeric value or string that is monotonically ordered and sortable to within some predefined degree of resolution, such as within one millisecond. In at least one embodiment, each node of the system is capable of generating ULIDs that retain these qualities, even when the ULIDs are generated independently. In at least one embodiment, this is accomplished, in part, by appropriate synchronization of a clock maintained by each node. However, in some cases, a global clock or similar mechanism may also be used.

In at least one embodiment, ULIDs may be paired with or include additional information to extend the resolution of the ULIDs. This information may indicate ordering of operations within the timeframe represented by the resolution. For example, if a ULID has one millisecond resolution, a database node might track the order in which it performs operations on data within each corresponding one millisecond interval. Data representing such operations can be stored with the ULID and the additional information, or with a ULID extended to include the additional information. This information can then be used to identify the operation. For example, when synchronizing with another node, the ULID and additional information can be used to collectively identify individual operations, even when the resolution of the ULID would otherwise be insufficient. In at least one embodiment, operations can be sorted using the ULID and extended information. This may be used, for example, when requesting or processing records for synchronization.

In at least one embodiment, node 100 comprises a node interface 106 that includes software and/or circuitry to process requests to read or write data. The node interface 106, in at least one embodiment, interfaces between the HTTP server 102 and other components of the node 100.

In at least one embodiment, node 100 comprises a storage interface 104, which includes software and/or circuitry to interface between various other components of the node 100 and a selectable storage subsystem 114. The storage interface 104 further comprises code and./or circuitry to enable use of a selection of a selectable storage subsystem 114. The selectable storage subsystem 114 may be referred to as a selectable due, at least in part, to it including software and/or circuitry making it compatible with the storage interface 104.

In at least one embodiment, a selectable storage subsystem 114 comprises software and/or circuitry to maintain one or more data structures in which a collection of data is stored. In at least one embodiment, selectable storage subsystem 114 comprises a storage engine using or based on technologies potentially including but not limited to in-memory hash tables, MongoDB, Redis, Memcached, PostgreSQL, MariaDB, and so forth. These or other technologies may be adapted to store data in main memory, such as in RAM, without a persistent backing store on the node 100. Data loss may be prevented by replicating between two or more nodes per dataset. For example, a primary node and one or more read-only replicas could be configured, so that if a primary node were to stop working, the data would still be available for reading from any one of the replica nodes. Writing could then become available when the primary node becomes functional, or when one of the replicas is promoted to primary. If a replica node were to become non-functional, it could be replaced by synchronizing with a new replica. With the data stored in RAM, this can be done quickly. For example, 50 thousand records of 2 KB size could be replicated, in at least one embodiment, in less than 7 seconds over average network conditions. To further reduce the risk of losing data, nodes may be configured to replicate across regions. This safeguards against the risk of multiple nodes in any one region failing simultaneously.

In at least one embodiment, the storage implementation of the node 100 is independently configurable from the database engine 112. The database engine 112 comprises other components of the system, such as a storage interface 104 (to interface with the selectable storage subsystem 114), a node interface 106, a journaling component 108, and a replication component 110. Embodiments of a database engine may omit or combine these components, and some components may be activated or deactivated. For example, in at least one embodiment, a node may be made into a primary node by activating a journaling component 108, in order to allow the node 100 to process write requests.

In at least one embodiment, the database engine 112 and/or selectable storage subsystem 114 are implemented using JavaScript and Node.js. JavaScript is a lightweight programming language that is widely available. Node.js is a runtime environment usable with JavaScript programs. The use of these technologies to implement the database engine 112 and/or selectable storage subsystem 114 helps to facilitate use of hosted services to deploy a distributed database, with minimal configuration or installation overhead.

The use of a selectable storage subsystem and a replication scheme that is self-executing, in at least one embodiment, enables new database nodes to be added without requiring the new nodes to use the same storage architecture as existing nodes. For example, within the same distributed database, and even within the same cluster, different nodes may employ different storage architectures. For example, some nodes may employ purely in-memory data storage, while others employ hybrid techniques in which part of the data is stored in-memory, and part of the data in persistent storage. Still other nodes may employ storage mechanisms that rely primarily or exclusively on persistent storage, such as sold-state or mechanical disk drives. In at least one embodiment, the selected storage subsystem can act as a proxy to storage on other systems, such as storage capacity provided by a hosted services architecture.

Figure 2:
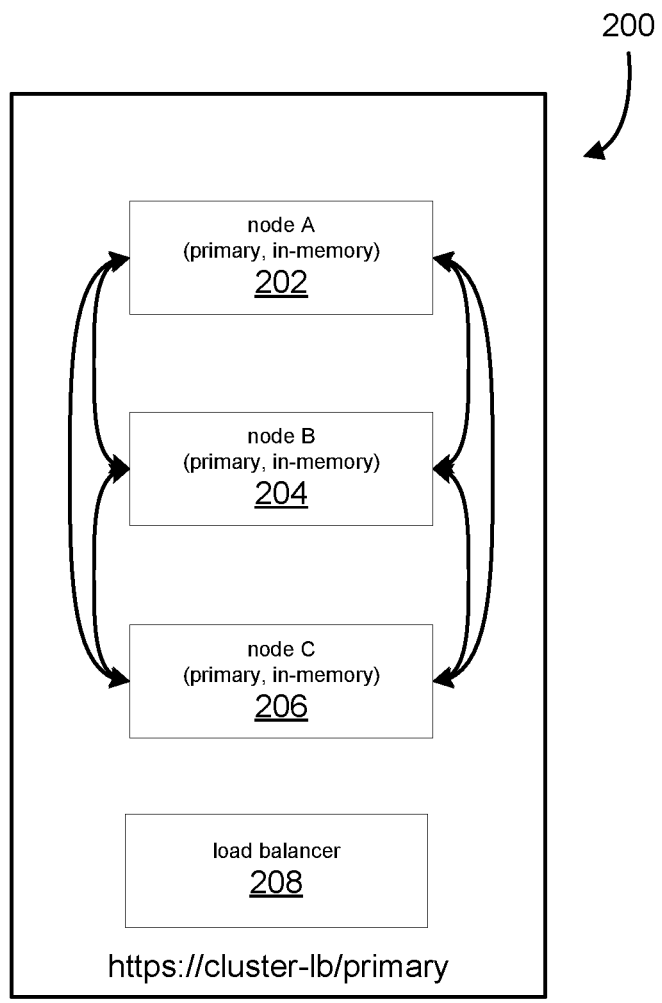
FIG. 2 illustrates a cluster of primary nodes of a distributed database, in accordance with at least one embodiment.

FIG. 2 illustrates a cluster of primary nodes of a distributed database, in accordance with at least one embodiment. As described with respect to FIG. 1, a distributed database may comprise one or more clusters of primary nodes. In the example of FIG. 2, a cluster 200 comprises three nodes 202-206, each of which is configured to act as a primary node. Embodiments may, however, include any number of primary nodes. The nodes may correspond to the node 100 depicted in FIG. 1.

In at least one embodiment, a cluster 200 of nodes is accessible via HTTP. For example, as depicted in FIG. 2, the cluster 200 can be accessed via the HTTP address "https:// cluster-1b/primary." It will be appreciated that this example is intended to be illustrative rather than limiting. In at least one embodiment, data may be read from or written to one of the primary nodes 202-206 via an interface, such as a REST interface, that leverages HTTP.

In at least one embodiment, a load balancer 208 comprises software and/or circuitry to distribute workload between the primary nodes 202-206. For example, if a client device issues a command to store data by invoking an appropriate command to an HTTP address associated with the cluster 200, a load balancer might then direct the request to one of the three primary nodes 202-206. This can be done using any of a variety of HTTP load balancing techniques, potentially including but not necessarily limited to transport-layer and application-layer load balancers, network load balancers, gateway load balancers, and so forth.

In at least one embodiment, the primary nodes 202-206 are configured to replicate data stored in the other nodes. As described with respect to the node 100 of FIG. 1, the primary nodes are self-executing with respect to replication. For example, primary node "A" 202 might be configured to drive replication of data stored in nodes "B" and "C" 204, 206 by periodically querying those nodes for updates that node "A" has not yet processed.

Note that in addition to the configuration shown in FIG. 2, many other replication configurations are possible. For example, in at least one embodiment, a cluster might comprise primary nodes that replicate in serial, e.g. a node $N_2$ might replicate from $N_1$, and a node $N_3$ might replicate from $N_2$, and so on. In at least one embodiment, there might be primary nodes that maintain partitioned subsets of a dataset, such as data whose keys hash to a given value or whose keys start with a particular range. The use of self-executing replication may simplify or enable such configurations, at least because it allows additional nodes, including primary nodes, to be added to a distributed database, including clusters within the database, without disturbing the configuration of pre-existing nodes.

Also note that, in at least one embodiment, the replication that occurs between the primary nodes 202-206 occurs via HTTP. For example, a replication query issued by a first primary node 202 is transmitted to a second primary node 204 over HTTP, using any of a variety of protocols or techniques such as REST, JSON, and so forth. The use of HTTP allows nodes to be easily added to a hosted services environment with little additional configuration. In at least one embodiment, a node can be added and begin participating in replication without changing the configuration of any pre-existing node. In some cases, the load balancer 208 might be modified to begin routing read or write requests to the node, or only read requests if the node is read-only.

Figure 3:
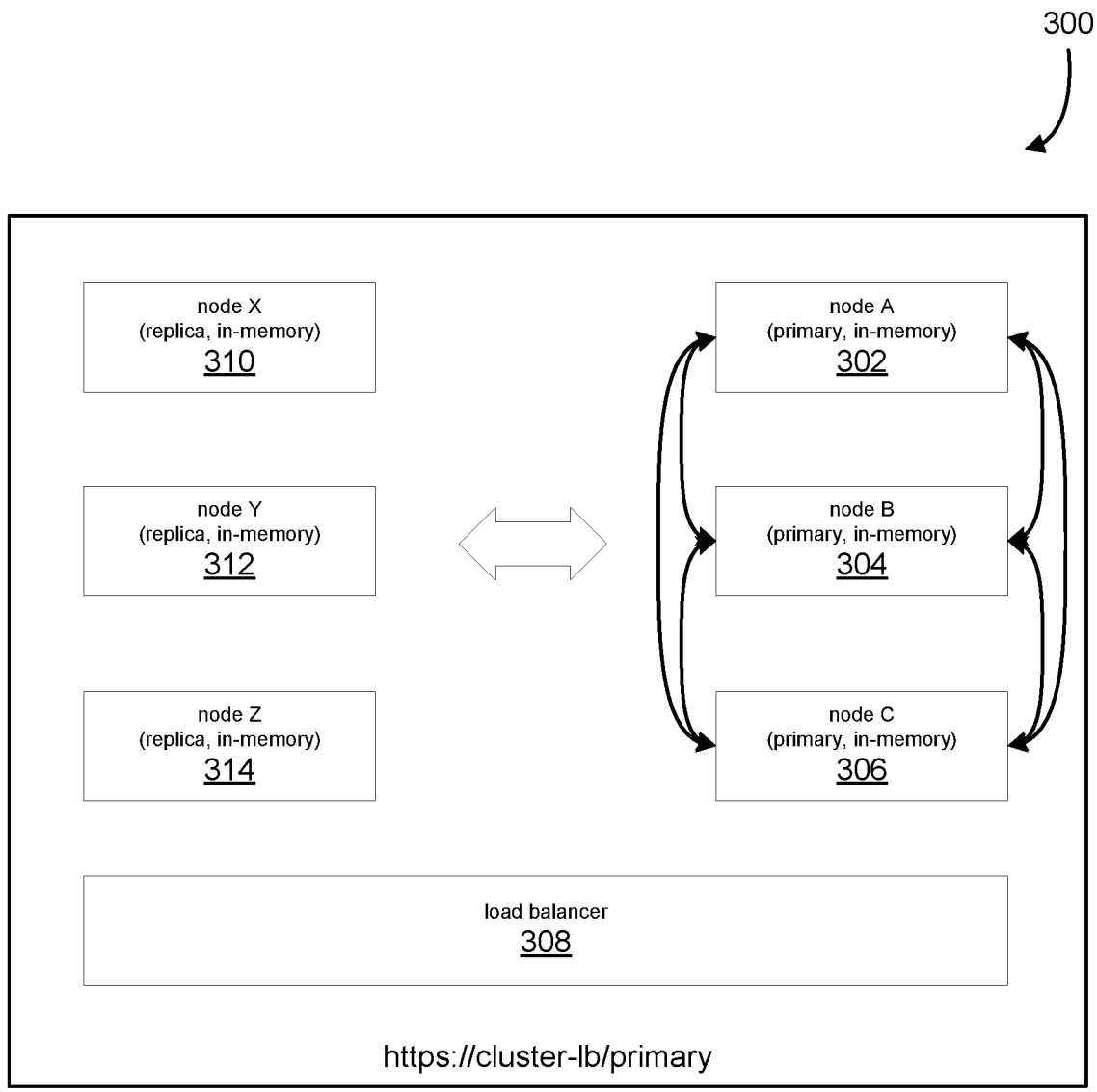
FIG. 3 illustrates read-only replicas associated with a cluster of a distributed database, in accordance with at least one embodiment.

FIG. 3 illustrates read-only replicas associated with a cluster of a distributed database, in accordance with at least one embodiment. In the example of FIG. 3, a cluster 300 may include primary nodes 302-306 that each correspond to the node 100 depicted in FIG. 1, and are configured in a cluster similarly to the example cluster 200 of FIG. 2. Similarly to FIG. 2, requests to write data to the cluster 300 may be load-balanced, by load balancer 308, between the primary nodes 302-306. Replication between the primary nodes 302-306, similarly to the primary nodes 202-206 of FIG. 2, is self-executed by each primary.

In addition to the primary nodes 302-306, the cluster 300 may comprise non-primary nodes 310-314, which may also be referred to as read-only nodes or replicas. These nodes may also be self-executing with respect to replication, and perform replication via queries issued over HTTP. For example, node "X" 310 might periodically query node "A" 302, node "Y" 312 might periodically query node "B" 304, and node "Z" 314 might periodically query node "C" 306. The replication occurring between the nodes may occur similarly, whether between two primaries, a primary and a replica, or between two replicas. In at least one embodiment, a node requests replication data from another node, and supplies a ULID that indicates the requesting node's current state. The responding node then uses the ULID to provide updates subsequent to the time indicated by the ULID. The primary nodes 302-306 and replicas 310-314 may replicate, similarly to the nodes depicted in FIG. 2, using HTTP-based protocols such as REST or JSON.

Figure 4:
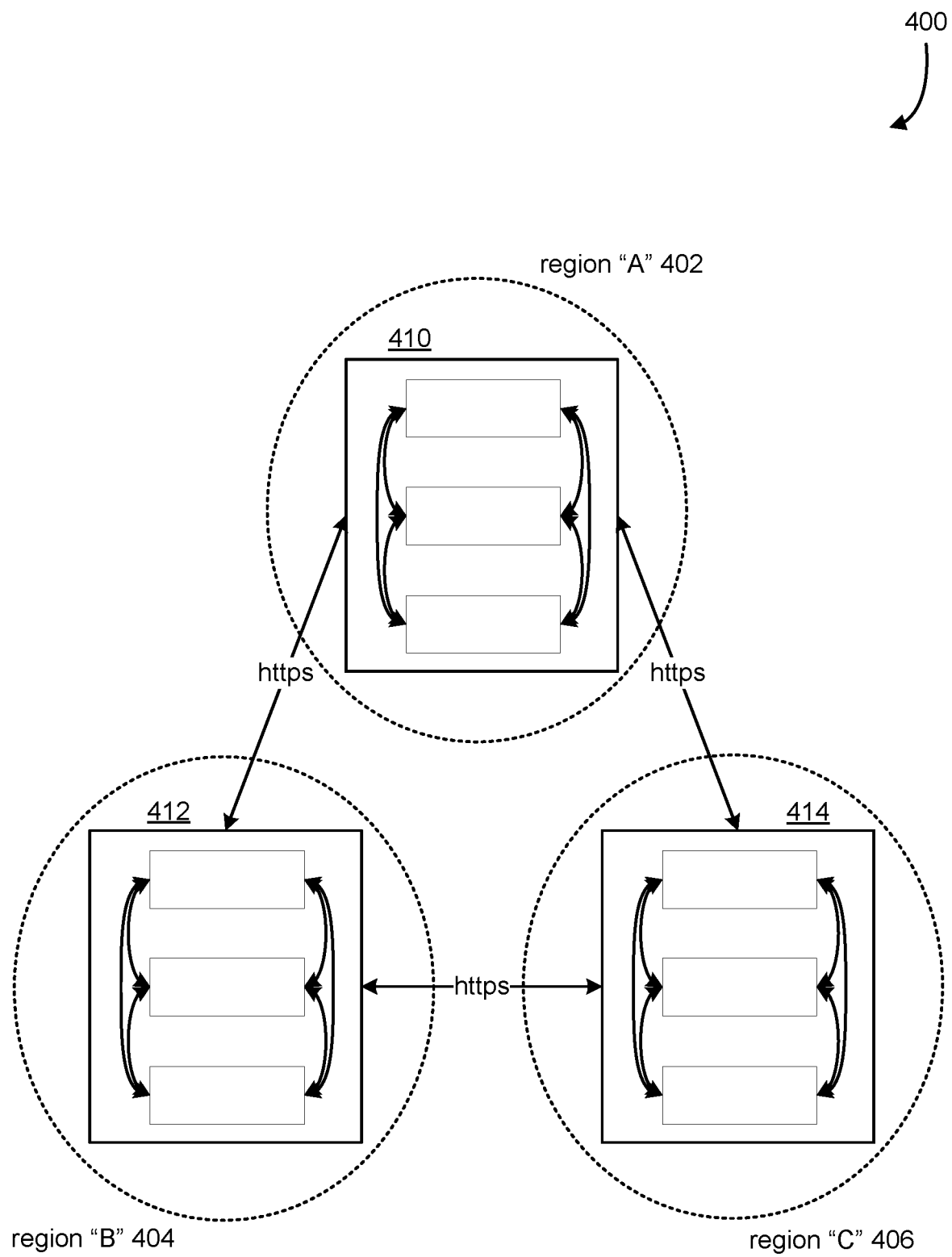
FIG. 4 illustrates an example of cross-region replication, in accordance with at least one embodiment.

FIG. 4 illustrates an example 400 of cross-region replication, in accordance with at least one embodiment. As depicted in the example 400, a distributed database may comprise clusters 410-414 located in respective regions A, B, and C 402-406. Each of the clusters 410-414 may be similar to any of the clusters depicted in FIG. 2 or 3. Cross-regional replication can occur between these clusters 410-414 in a manner similar or identical to that used to replicate between nodes within clusters, as is described in relation to FIGS. 2 and 3. Similar to replication in those figures, cross-regional replication is performed using an HTTP-based protocol, such as REST or JSON.

Embodiments may employ a variety of configurations to accomplish cross-regional replication. As with intra-regional cases, this is accomplished using self-executing replication by the nodes. For example, in at least one embodiment, a node $N_1$ in region "A" 402 may be configured to periodically query a node $N_2$ in region "B" 404, and a node $N_3$ in region "C" 406. The node $N_2$ might similarly query $N_1$ and $N_3$, and the node $N_3$ might query $N_1$ and $N_2$. Within a given region, the data is then replicated according to the configuration of nodes within that region. Due to the relative performance advantages of maintaining datasets in-memory, the speed of replication can be fast enough to cause the data to be made consistent within tolerable timeframes.

A variety of other configurations are possible. In another example, each node in region "A" 402 synchronizes with corresponding nodes in region "B" 404 and "C" 406. For example, if region "A" 402 includes nodes $N_{1a}, N_{2a}, \ldots$ and region "B" 404 includes $N_{1b}, N_{2b}, \ldots$, then the node $N_{1a}$ might query the node $N_{1b}$, the node $N_{2a}$ might query the node $N_{2b}$, and so on. These synchronization queries may also be performed using HTTP.

In at least one embodiment, local node configurations are used to indicate node topology, rather than employing more complex dynamic or auto-discovery techniques. When a node requests the ordered history of recent state changes from another node, the response may include changes produced not only from that node, but also from other nodes in the network as well. With appropriate configuration, this allows a node that is replicating from a small subset of nodes to be eventually consistent with the entire network state.

In at least one embodiment, each node stores only the last change applied to a record in its transaction history. This helps ensure that when other nodes request synchronization data, they only receive the last status of every record.

In at least one embodiment, node synchronization is performed asynchronously, and nodes are kept available for reading and writing without interruption, or for reading only in the case of replica nodes. These nodes are intended to act as read-only nodes, and as such that may avoid maintaining transaction history and consequently consume fewer hardware resources.

Figure 5:
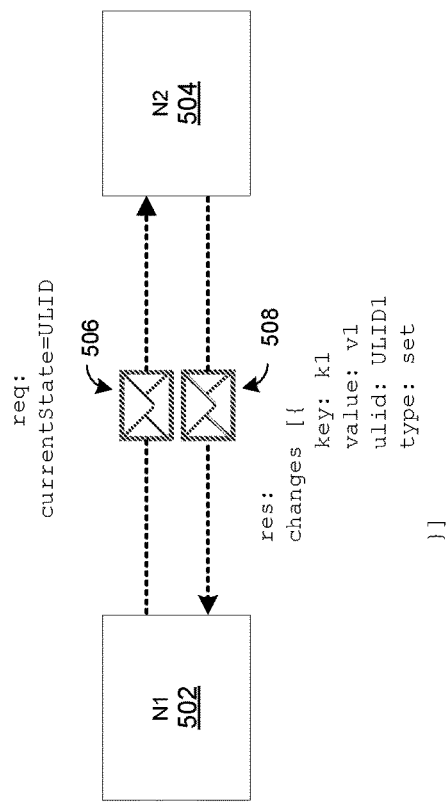
FIG. 5 illustrates an example of synchronization between nodes of a distributed database, in accordance with at least one embodiment.

FIG. 5 illustrates an example 500 of synchronization between nodes of a distributed database, in accordance with at least one embodiment. The example 500 illustrates a node $N_1$ 502 performing a self-executed replication query, in order to obtain synchronization data from another node $N_2$ 504. The nodes $N_1$ 502 and $N_2$ 504 may correspond to the node depicted in FIG. 1, and may be included in any arrangement of nodes and clusters, such as any of those depicted in FIGS. 2-4. It is assumed, for the illustrative purposes of the example 500, that node $N_1$ 502 has been configured to obtain replication data from $N_2$ 504.

To obtain replication data, the node $N_1$ 502 periodically sends a replication query 506, which may also be referred to as a request, to node $N_2$ 504. The replication query 506 can include any transmission that include data to specify the nature of the query. In at least one embodiment, the replication query 506 includes a ULID to identify the current state of the node $N_1$. Here, the current state of $N_1$ refers to the data that the node $N_1$ 502 has processed. For example, in at least one embodiment, the node $N_1$ 502 associates a ULID with each update, where the ULID monotonically increases and has one millisecond resolution compared to ULIDs generated by other nodes. The current state of $N_1$ 502, as represented by the ULID in the replication query 506, therefore indicates, up to millisecond, which updates from those other nodes that $N_1$ 502 has processed.

The node $N_2$ 504, in response to receiving the replication query 506, examines the portion of the collection of data it maintains, and identifies data whose associated ULIDs are greater than the ULID provided in the replication query 506. In at least one embodiment, the node $N_2$ 504 also identifies data whose associated ULIDs are equal to the provided ULID. This data may then be sent as a response 508 to $N_1$ 502 for processing.

In at least one embodiment, the response 508 comprises data that indicates changes to the data maintained by $N_2$ 504. In the example 500, the response 508 comprises an array of data indicating changes to the data maintained by $N_2$ 504, where each entry in the array comprises a ULID, a type of operation, a key, and (for at least some types of operations) a value. The ULID indicates the ordering of the operation with respect to other operations in the system. The type of operation, in at least one embodiment, indicates whether the operation is an add, set, or delete. It will be appreciated that these examples of operation types are intended to be illustrative rather than limiting. For add and set operations, the entry comprises a key that identifies the affected item, and a value for that item. In the case of delete operations, the entry comprises a key to identify the deleted item. It will be appreciated that these examples are intended to be illustrative, rather than limiting.

In at least one embodiment, the node $N_1$ 502 receives the response 508 and processes it. This can include applying the received data to the collection of data that $N_1$ 502 maintains. For example, with respect to the example response 508, the node $N_1$ 502 might confirm that it has not yet processed an update corresponding to "ULID1," determine that the update corresponds to a "set" operation, and set the value of an item, whose key is equal to "k1," to the value "v1." It will be appreciated that this example is intended to be illustrative, rather than limiting.

Figure 6:
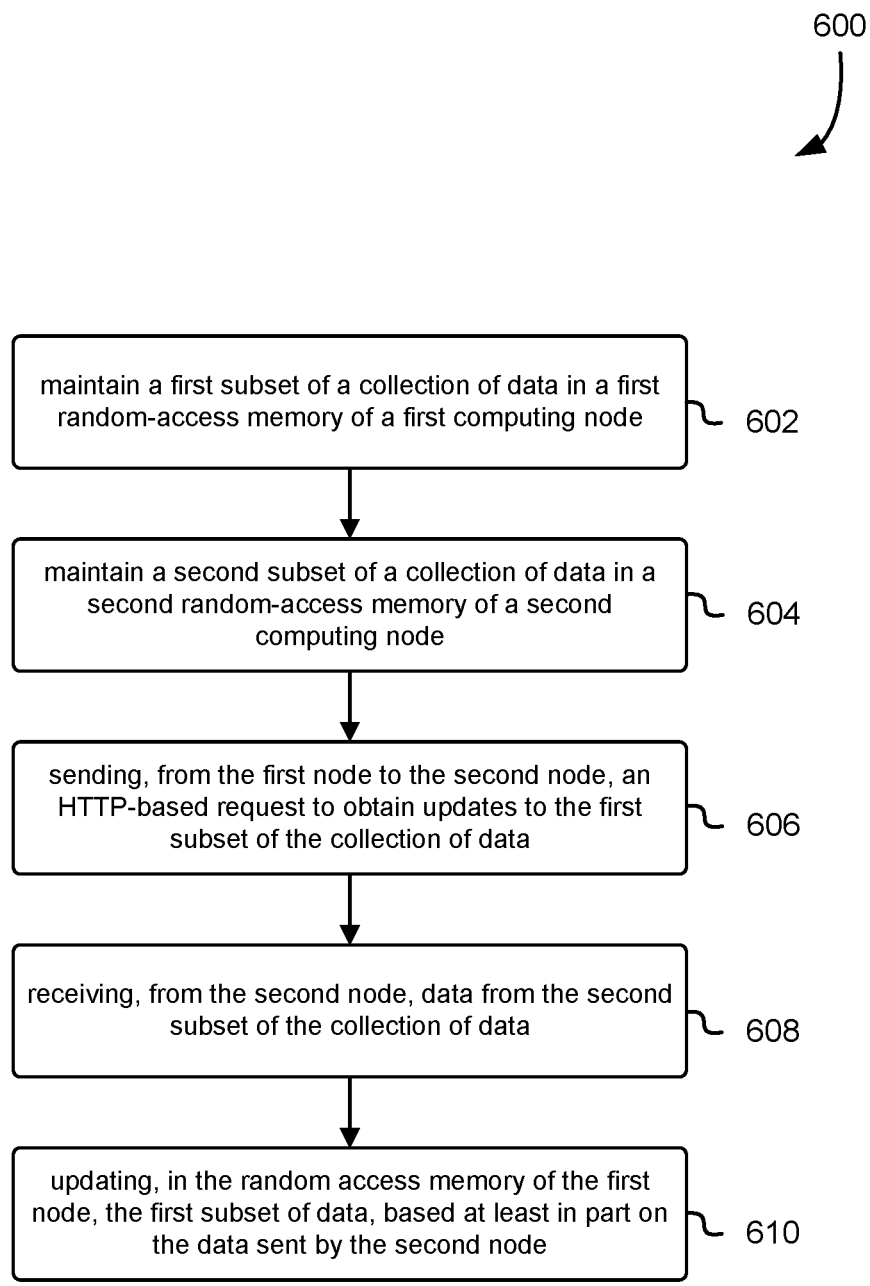
FIG. 6 illustrates an example process for operating a distributed database, in accordance with at least one embodiment.

FIG. 6 illustrates an example process 600 for operating a distributed database, in accordance with at least one embodiment. Although FIG. 6 is depicted as a series of steps or operations, embodiments may, except where explicitly stated or logically required, alter the order of the depicted steps or operations, perform the depicted steps or operations in parallel, or omit certain steps, while remaining within the scope of the present disclosure.

The example process 600, as depicted in FIG. 6, may be performed by nodes of a distributed database. For example, in at least one embodiment, the example process 600 is implemented by nodes similar to the node 100 depicted in FIG. 1. The nodes may be arranged in a cluster or clusters, such as any of those depicted in FIGS. 2-4. In at least one embodiment, the nodes perform self-executing replication using a process similar to what is described in relation to FIG. 5.

At 602, a first subset of a collection of data is maintained by a first computing node. This first subset is maintained in a first random-access memory of the first database node. The collection of data, in at least one embodiment, is a key-value collection of data. The subset may coincide with the entirety of the collection, meaning that it is intended to include all of the collection of data, though at any given time it may contain more or less than the entire collection, due to delays in synchronization. In other cases, the subset may correspond to a partition of the collection. For example, the subset maintained by the first node may correspond to items whose keys fall within a certain range, or whose keys hash to a particular value.

In at least one embodiment, the first database node is operative on a computing device, such as a compute node comprising a processor and a memory that comprises instructions for performing the various steps and operations described in relation to example process 600.

In at least one embodiment, maintenance of the collection of data comprises one or more of responding to requests to store data, responding to requests to read data, periodically obtaining synchronization data from other nodes, and responding to requests to provide synchronization data when such data is requested from another node.

At 604, a second subset of a collection of data is maintained by a second computing node. This second subset is maintained in a second random-access memory of the second database node. The second subset, in the example process 600, is presumed to coincide at least partially with the first subset of data maintained by the first database node. For example, in some cases both subsets of the collection of data may be essentially the same data sets, except for differences associated with incomplete synchronization. In other cases, the first subset might be entirely included in the second subset (except for differences associated with incomplete synchronization), but not vice versa. In still other cases, only a portion of the first subset is included in the second subset. This might happen, for example, if the first node synchronizes from a plurality of other nodes.

At 606, the first node sends, to the second node, an HTTP-based request to obtain updates to the first subset of the collection of data. In at least one embodiment, this is done periodically, in order to keep the contents of the first node synchronized with the contents of the second node. The request, in at least one embodiment, comprises a ULID that indicates the current state of the first node's collection, to allow the receiving second node to determine what data it should send back to the first node for processing.

At 608, the first node receives, from the second node, data from the second subset of the collection of data. The data from the second node is obtained in view of the ULID provided in the request. In at least one embodiment, the second node identifies data associated with ULIDs ordered after the ULID provided in the request, and provides that identified data to the first node.

At 610, the first node updates, in the random-access memory of the first node, the first subset of data. The first subset is updated using the data sent from the second node. In at least one embodiment, the first node updates data in the first subset of data by applying the operations described in the received data. For example, if the received data comprises a set k1=v1 operation and a delete k2 operation, the first node will perform the set the value of k1 to v1 and delete the item corresponding to key k2. Note that in some cases, depending on the resolution of the ULID and how often synchronization data is requested, it may be possible, in some embodiments, for a node to receive the same update twice. Any of a variety of methods may be employed to prevent this from happening or, if it does happen, prevent it from resulting in an error. For example, embodiments may ensure that synchronization requests are performed less frequently than the resolution of the ULID, and embodiments may track the ULIDs of operations that a node has processed.

As described herein, for example with respect to FIGS. 2 and 3, a distributed database can be organized into one or more clusters, where each cluster comprises a plurality of nodes. In at least one embodiment, a cluster contains at least first and second nodes, where both of the first and second nodes are configured as primary nodes. Here, being primary nodes means that both the first and second nodes are capable of processing write requests, such as "set," "put," "update," or "insert."

As described herein, for example with respect to FIG. 4, a distributed database can comprise a plurality of clusters. In at least one embodiment, a distributed database comprises a first cluster of nodes that obtains data replicated from a second cluster of nodes. The replication data is obtained by sending, from a node of the first cluster to a node of the second cluster, an HTTP-based request to obtain replication data.

As described herein, for example with respect to FIG. 3, a distributed database can include nodes that are read-only replicas. In at least one embodiment, a node is configured to maintain a read-only replica of at least a portion of the collection of data maintained by other nodes. The configuration, in at least one embodiment, comprises information indicating one or more other nodes from which replication data should be obtained. This could, for example, be a list of HTTP addresses that correspond to the other nodes.

A node's configuration data may, in some embodiments, include data that defines the subset of data that the node will replicate. For example, in at least one embodiment, a node includes criteria that can be applied as a filter by a node from which replication data is requested. This may be used, for example, when a node acts as a partitioned replica.

A node's configuration data may also include information indicating how often it should attempt to synchronize data. For example, a node may have configuration data indicating a wait period between replication attempts. In at least one embodiment, the configuration may identify nodes from which data should be obtained, and how often, for each respective node, the data should be requested. This allows synchronization to be performed at different rates between different nodes.

A benefit of at least some of the aforementioned techniques is that new nodes can be added to the distributed database with minimal configuration effort, and little to no disruption of the operation of existing nodes. In at least one embodiment, a new node can be added to a distributed database by activating a compute node on which a database engine and storage subsystem will operate, and then causing the database engine to begin synchronizing from another database node. A new node may also be made to act as a primary by activating a journal implementation on the new node. In some cases, activating a primary node also comprises modifying the configuration of a load balancer to route traffic to the new node.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including the provision of flexible and scalable database services that leverage low-cost infrastructure. Certain embodiments may further provide for the flexible addition or removal of database nodes, thereby scaling up or down as needed, with minimal configuration changes to existing aspects of the system.

Figure 7:
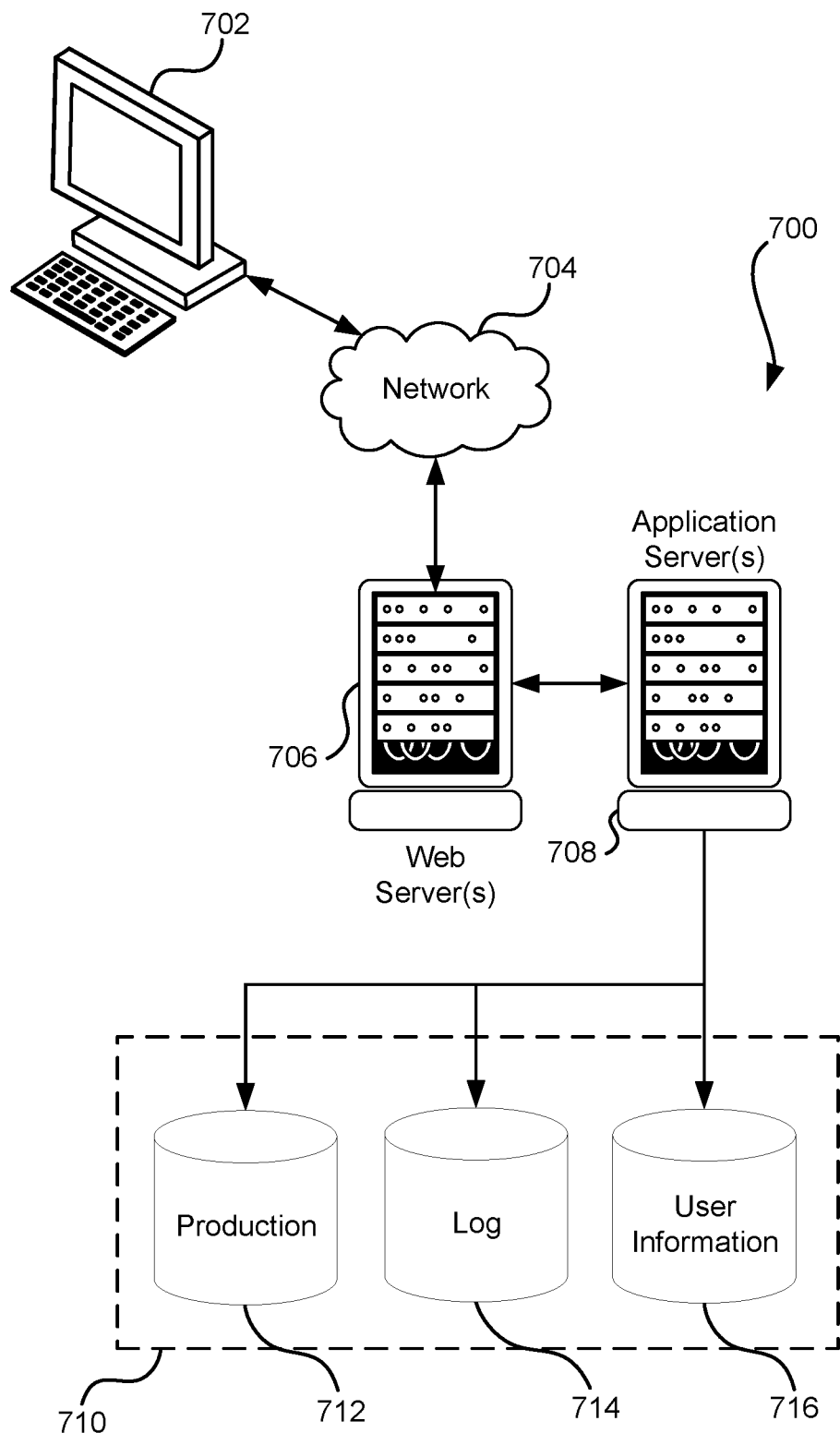
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java©, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A distributed database, comprising:
    at least one processor; and
    memory comprising computer-executable instructions that, in response to execution by the at least one processor, cause the distributed database to at least:
    maintain, by a plurality of nodes, a collection of key-value data, wherein the plurality of nodes comprises at least a first node and a second node, wherein the first node comprises an interface to a selectable storage system and a selected first storage subsystem;
    maintain, by the first node, a first subset of the collection of key-value data on the selected first storage subsystem;
    maintain, by the second node, a second subset of the collection of key-value data on a second selected storage subsystem;
    replicate data, by the first node, from the second node by sending, to the second node, an HTTP-based request to obtain updates to the collection of key-value data, the HTTP-based request comprising a unique lexicographically sortable identifier, the unique lexicographically sortable identifier representing a most recent update of each respective node of the plurality of nodes;
    identify, by the second node, data in the second subset of the collection of key-value data to send to the first node based, at least in part, on a comparison between the unique lexicographically sortable identifier and one or more previously received unique lexicographically sortable identifiers; and
    update, by the first node, the first subset of the collection of data based, at least in part, on the data sent by the second node.

2. The distributed database of claim 1, further comprising a cluster of the plurality of nodes, the cluster comprising the first node and the second node, and wherein the first node and the second node are to each act as a primary node of the cluster.

3. The distributed database of claim 1, wherein the plurality of nodes comprises a third node to maintain a read-only replica of a third subset of the collection of key-value data, wherein the third node is configured to obtain replication data from one or more other nodes of the plurality of nodes.

4. The distributed database of claim 1, wherein the first selected storage subsystem is of a different type than the second selected storage subsystem.

5. The distributed database of claim 1, further comprising a first cluster of nodes to obtain data replicated from a second cluster of nodes by at least sending an HTTP-based request to obtain data from at least one node of the second cluster.

6. A computer-implemented method, comprising:
    maintaining a first subset of a collection of data by a first storage subsystem of a first node of a distributed database, wherein a second subset of the collection of data is maintained by a second storage subsystem of a second node of the distributed database;
    sending, from the first node to the second node, an HTTP-based request to obtain updates to the first subset of the collection of data, the HTTP-based request comprising a unique lexicographically sortable identifier, the unique lexicographically sortable identifier representing a most recent update of corresponding nodes of the distributed database;
    receiving data from the second node, the received data selected for sending by the second node based, at least in part, on a comparison between the unique lexicographically sortable identifier and one or more previously received unique lexicographically sortable identifiers; and
    updating, by the first storage subsystem of the first node, the first subset of the collection of data based, at least in part, on the data sent by the second node.

7. The computer-implemented method of claim 6, further comprising:
    forming a cluster comprising the first node and the second node, wherein the first node and the second node are each configured as a primary node of the cluster.

8. The computer-implemented method of claim 6, further comprising: configuring a third node to maintain a read-only replica of a portion of the collection of data, wherein the configuring comprises indicating one or more other nodes from which replication data should be obtained.

9. The computer-implemented method of claim 6, further comprising:
    routing, by a load balancer, an HTTP-based request to store data to at least one of the first or second nodes.

10. The computer-implemented method of claim 6, wherein the distributed database comprises a first cluster of nodes that obtains data replicated from a second cluster of nodes by at least sending an HTTP-based request to obtain data from at least one node of the second cluster.

11. The computer-implemented method of claim 6, further comprising converting an additional node of the distributed database to be a primary node by at least activating a journaling component on the additional node.

12. The computer-implemented method of claim 6, wherein the first node periodically queries the second node for replication data.

13. The computer-implemented method of claim 6, wherein a configuration of the first node comprises criteria for selecting data for inclusion in the first subset of the collection of data.

14. A non-transitory computer-readable storage medium storing thereon executable instructions that, as a result of being executed by one or more processors of a computer system, cause the computer system to at least:
    store a first subset of a collection of data by a first storage subsystem of a first node of a distributed database;
    send, from the first node to a second node, an HTTP-based request to obtain updates to the first subset of the collection of data, the HTTP-based request comprising a unique lexicographically sortable identifier, the unique lexicographically sortable identifier representing a most recent update of each respective node of the distributed database;
    receive data selected by the second node based, at least in part, on a comparison between the unique lexicographically sortable identifier and one or more previously received unique lexicographically sortable identifiers; and update, by the first storage subsystem of the first node, the first subset of the collection of data based, at least in part, on the data sent from the second node.

15. The non-transitory computer-readable storage medium of claim 14, wherein the executable instructions further comprise instructions that, as a result of being executed by the one or more processors, cause the computer system to:
form a cluster comprising the first node and the second node, wherein the first node and the second node are each a primary node of the cluster.

16. The non-transitory computer-readable storage medium of claim 14, wherein a configuration of the first node comprises a list of nodes from which to obtain synchronization data.

17. The non-transitory computer-readable storage medium of claim 14, wherein the executable instructions further comprise instructions that, as a result of being executed by the one or more processors, cause the computer system to:
activate a journaling component in response to a request to enable operation as a primary node of the distributed database.

18. The non-transitory computer-readable storage medium of claim 14, wherein the distributed database comprises a first cluster of nodes that obtains data replicated from a second cluster of nodes by at least sending an HTTP-based request to obtain data from at least one node of the second cluster.

19. The non-transitory computer-readable storage medium of claim 14, wherein the distributed database comprises a plurality of nodes including the first node and the second node, and wherein the plurality of nodes comprises at least two nodes with storage subsystems of different types.

20. The non-transitory computer-readable storage medium of claim 14, wherein a configuration of the first node comprises criteria for selecting data for inclusion in the first subset of the collection of data.

\* \* \* \* \*